United States Patent
Pettersson et al.

(10) Patent No.: US 6,497,434 B2
(45) Date of Patent: Dec. 24, 2002

(54) DEVICE AND METHOD FOR MOUNTING OF A LEAD-THROUGH MEANS

(75) Inventors: Måns Pettersson, Göteborg (SE); Göran Johansson, Värnamo (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/783,948

(22) Filed: Feb. 15, 2001

(65) Prior Publication Data

US 2001/0017468 A1 Aug. 30, 2001

Related U.S. Application Data

(63) Continuation of application No. PCT/SE99/01352, filed on Aug. 9, 1999.

(30) Foreign Application Priority Data

Aug. 17, 1998 (SE) .............................................. 9802737

(51) Int. Cl.$^7$ ................................................. F16L 3/04
(52) U.S. Cl. .................... 285/189; 285/140.1; 285/210; 285/921
(58) Field of Search ................................ 285/189, 210, 285/140.1, 319, 921

(56) References Cited

U.S. PATENT DOCUMENTS

| | | | | |
|---|---|---|---|---|
| 4,088,241 A | * | 5/1978 | Hall et al. ................ | 285/140.1 |
| 4,291,904 A | * | 9/1981 | Iversen et al. ........... | 285/140.1 |
| 4,352,358 A | * | 10/1982 | Angelchik ................ | 285/140.1 |
| 5,145,216 A | * | 9/1992 | Valls, Jr. .................. | 285/140.1 |
| 6,082,782 A | * | 7/2000 | Bartholoma et al. ..... | 285/140.1 |

FOREIGN PATENT DOCUMENTS

| | | |
|---|---|---|
| DE | 37 01 597 A1 | 8/1988 |
| DE | 42 13 727 C1 | 4/1993 |
| DE | 41 09 206 C1 | 5/1993 |
| EP | 0481 872 A1 | 4/1992 |
| EP | 0 572 823 A1 | 12/1993 |

* cited by examiner

Primary Examiner—Eric K. Nicholson
(74) Attorney, Agent, or Firm—Howrey Simon Arnold & White LLP

(57) ABSTRACT

Method and apparatus for providing a duct arrangement adapted for installation through an opening in a wall (3), preferably of a vehicle. The arrangement includes an elongated ducting element (2) that has a sealing component (9) projecting therefrom on all sides and which is designed to bear against the edges of the opening so that sealing is produced between the two sides of the wall and establishes an installed position. Behind the component (9), when viewed in the direction of ducting, is a flexible section (5), which under loading of a part in front of the said section (5), permits displacement of the said part in relation to its unloaded longitudinal extent. The wall (3), when viewed from its front face in the direction of ducting, has a depression (6) formed all around the opening so that the opening essentially forms the lowest point of the depression (6). This configuration is designed to guide a tip of the ducting element (2) toward and through the opening to the installed position.

11 Claims, 2 Drawing Sheets

DEVICE AND METHOD FOR MOUNTING OF A LEAD-THROUGH MEANS

RELATED PATENT APPLICATIONS

This is a continuation patent application of International Application Number PCT/SE99/01352 filed Aug. 9, 1999 entitled DEVICE AND METHOD FOR MOUNTING OF A LEAD-THROUGH MEANS that designates the United States. The full disclosure of said application, in its entirety, is hereby expressly incorporated by reference into the present application.

TECHNICAL FIELD

The present invention relates to an arrangement in a duct through an opening in a wall, preferably in a vehicle, comprising an elongated ducting element. The present invention also relates to a method of placing an elongated ducting element in an installed position in an opening in a wall, preferably in a vehicle.

BACKGROUND OF THE INVENTION

It is sometimes necessary when manufacturing vehicles to lead lines of different types, for example pipes for liquids or gases or electrical cables, through sheet metal walls of the vehicle. For this purpose, holes are drilled in the sheet metal plates, following which the lines can be drawn through the sheet metal plates. In many applications, however, it is required that the ducting through the sheet metal walls be designed in such a way that it is impossible for water, moisture, and in certain situations, even sound to penetrate through the hole in the sheet metal wall. A common method used today for sealing off such a hole in the sheet metal wall is to install a rubber ring in the hole with an opening at the very center. The outside radius of the ring coincides with the inside radius of the hole. A drainage hose, or any of the other above-mentioned types of lines are led through the opening in the rubber ring.

There are, however, inherent deficiencies associated with these conventionally designed lead-through arrangements and methods for installing the same; responsively, the present invention has been developed. Important enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed devices and methods for mounting lead-through means in vehicle walls and incorporates several additionally beneficial features.

One object of the present invention is to produce a duct through a wall that can be installed by means of a robot. In another aspect, a goal is to produce a duct that is installable by a robot and that is liquid and moisture -tight, as well as soundproof.

According to the present invention, these goals and objectives are achieved in one design by way of an arrangement in which a ducting element has a component projecting therefrom on all sides. The element is designed to bear against the edges of the opening so that sealing is produced between the two sides of the wall and defines an installed position. Behind the element, when viewed in the direction of the ducting, there is a flexible section, which under the effect of a slight force applied anywhere along the longitudinal extent of one part in front of the section, permits displacement of the part in relation to the unloaded longitudinal extent of the part. The wall, when viewed from its front face in the ducting direction, has a depression formed all around the opening so that the opening essentially forms the lowest point of the depression. The depression is designed to direct the tip of the ducting element towards the opening and through the opening to the installed position.

The invention also includes a related method that is characterised in that the ducting element is provided with a component projecting on all sides which, when the ducting element is placed in the installed position, bears against the edges of the opening, so that sealing is produced between the two sides of the wall. Behind the element, when viewed in the direction of ducting, the ducting element is provided with a flexible section such that, under the effect of a slight force applied anywhere along the longitudinal extent of one part in front of the said section, the part is displaced in relation to its unloaded longitudinal extent. The wall, viewed from its front face in the ducting direction, is provided with a depression all around the opening, so that the opening essentially forms the lowest point of the depression and that the tip of the ducting element is inserted towards the depression and directs the tip so that it is guided towards the opening and through the latter to the installed position.

The arrangement and the method according to the invention have a number of advantages compared to previous designs. The depression formed in the wall, together with the fact that the part in front of the flexible section can form angles with its direction of movement allows the tip of the ducting element to be directed toward, and through the opening during installation, even if the movement is not aimed precisely towards the opening. These error tolerances facilitate robot installation of the ducting element. The diameter of the depression can be selected according to prevailing circumstances, such as the performance of the robot, for example, so that when installing the ducting element it always strikes the wall somewhere in the depression. In addition, a ducting element utilized in accordance with the invention has a simple construction formed in a single piece and which can be manufactured at low cost. An arrangement in accordance with the invention may be used for ducting various types of media, such as liquids and gases, for example. In another utilization, one or more electrical cables may be drawn through the ducting element.

BRIEF DESCRIPTION OF THE DRAWINGS

The invention will now be described in greater detail in the following way, by example only, and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
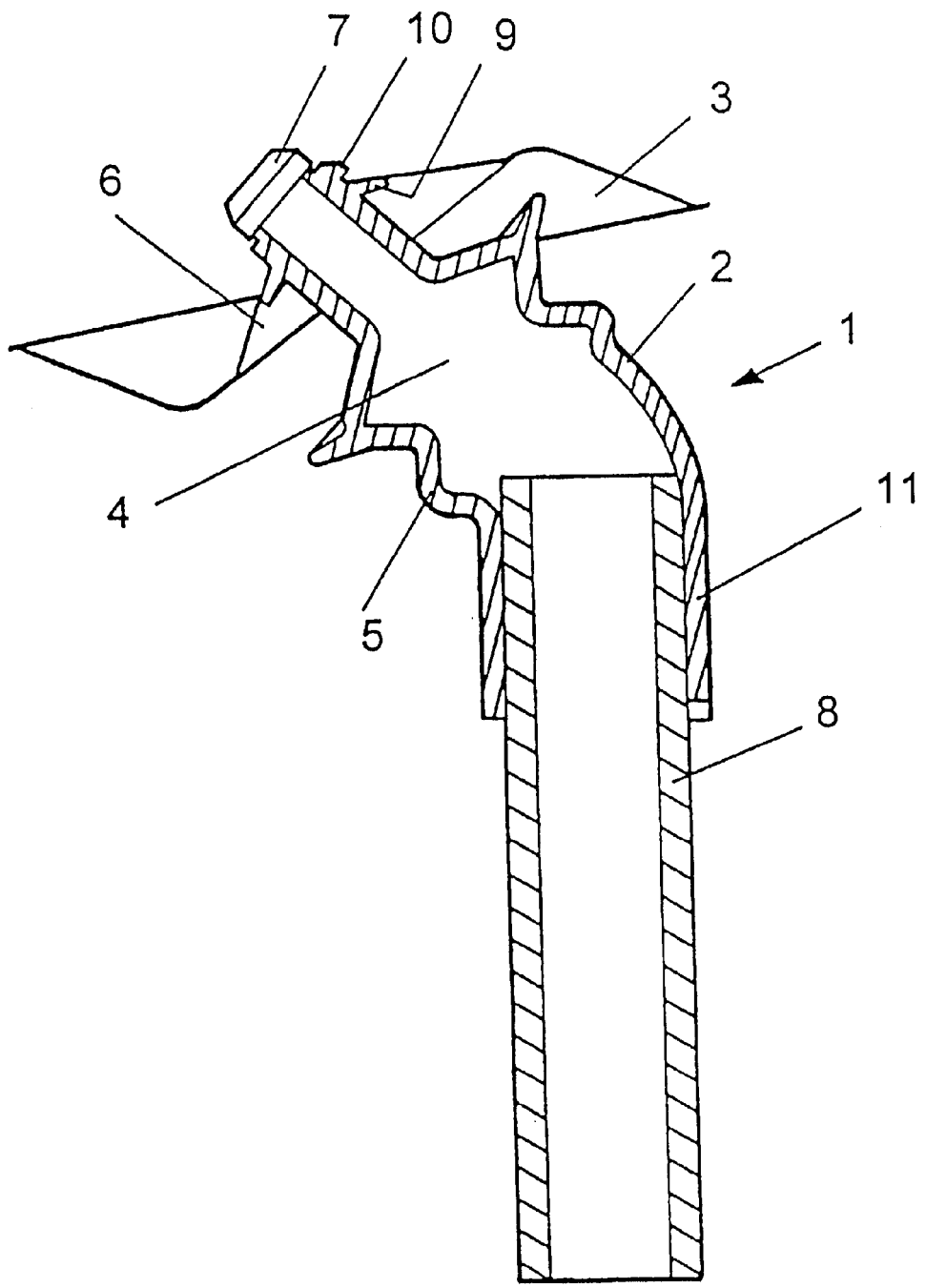
FIG. 1 is a partial cross-sectional view of an installed ducting arrangement in accordance with the present invention.

Referring to FIG. 1, the reference number 1 denotes an arrangement in a duct through an opening in a wall 3, comprising a ducting element 2. The wall 3 in one embodiment is a sheet metal plate of a vehicle. Naturally, walls of other rigid material are also contemplated. The ducting element 2 is elongate with a through-duct portion 4 running in a longitudinal direction of the element 2. The duct 4 is designed to convey liquids or gases, for example, between the two ends of the ducting element 2. Alternatively, an electrical cable may also be carried through the duct element 2. The ducting element 2 may be manufactured from any rubber or similar material such as EDPM (ethylene-propylene-diene-methylene).

In order to simplify the explanation we shall divide the ducting element 2 into two parts. The first part is that portion which, with the ducting element 2 in the installed position, is inserted through the wall opening, while the second part is not inserted through the opening. FIG. 1 illustrates this installed position. The diameter along the length of the first part is somewhat less than the diameter of the opening. The second part, in an area close to the boundary with the first part, has a flexible section 5, designed so that under the effect of a force applied anywhere along the longitudinal extent of the first part, the first part is displaced in relation to its longitudinal extent not subjected to loading. In the example shown, the flexible section is formed by radial corrugations, preferably running all round.

The plate 3 has a depression 6 that, viewed from its front face, is formed around the opening, so that the opening essentially forms the lowest point of the depression 6. In one example the depression 6 is essentially funnel-shaped. If the ducting element 2 is held at its end by the second part and is directed towards the depression 6 in the plate 3, the flexible section 5 of the ducting element 2, together with the depression 6, will make it possible to guide the first part towards the opening and through the latter to the installed position. When the first part encounters the depression 6, and at the same time that a force is pressing the ducting element forwards the direction of movement, the funnel-shaped ducting element will be altered due to the depression 6 so that the first part passes through the opening. Since robot installation requires that a certain degree of misalignment be tolerated, it is necessary to be able to adjust the direction of movement of the ducting element 2 in this way. Consequently, the diameter of the depression is selected according to the performance of the robot so as to maximize the probability of the ducting element encountering the plate somewhere in the depression. The ducting element 2 has a guide fitted to the end of the first part. The guide 7 is that part of the ducting element, which during installation, encounters the plate 3. The guide 7 is made of a material such that the friction forces between the plate and the guide 7 remain low, and as a result of which the ducting element slides easily into the opening. In one example, the guide 7 is a plastic ring fitting in one end and which is detached when the arrangement 1 is installed.

In one example, the ducting element, at its end on the first part, is designed so that after the plastic ring has been detached, the ducting element can be fitted to any pipe (not shown) for conveying liquid or gas, for example. The second part, in the area around the end of the ducting element 2, has a connecting part 11 for connection to a pipe 8 for conveying liquid or gas. For example, the pipe 8 in turn may being connected to some system (not shown), for example an air conditioning system, in the vehicle. It is immaterial for the invention whether the pipe 8 and any associated system are fitted to the ducting element 2 before or after installation of the arrangement 1. In the example of FIG. 1, the second part of the ducting element is bent. This bend may be selected so that the ducting element 2 can be very easily connected the pipe 8 and an associated system.

The ducting element 2 has a flexible flange that defines the boundary between the first and the second part and which, in the installed position shown in FIG. 1, is deformed towards the edges of the opening so that the ducting element 2 forms a seal between the two sides of the wall.

Figure 2:
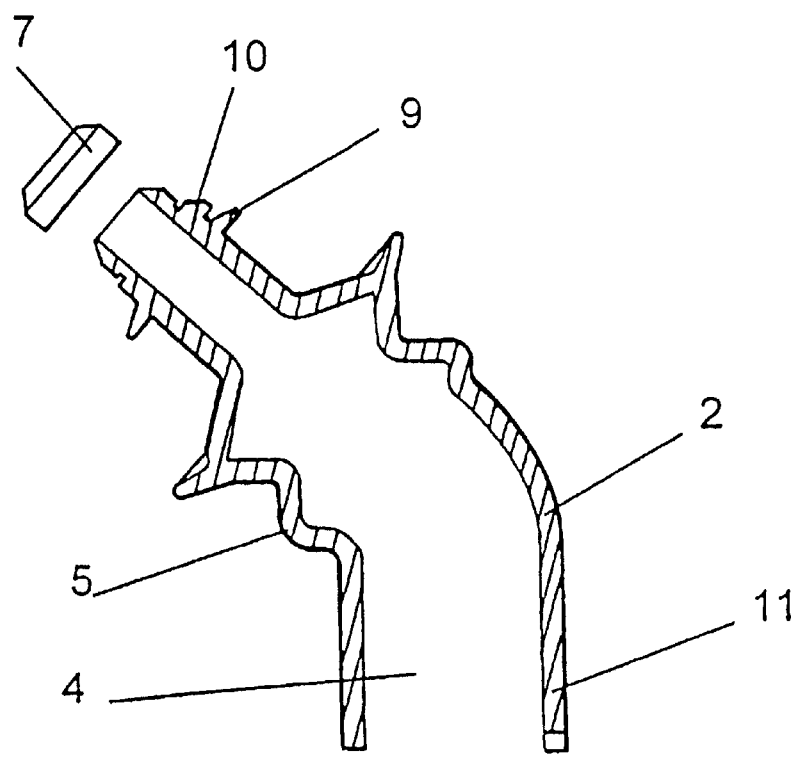
FIG. 2 is a detailed cross-sectional view showing the ducting element of FIG. 1, but uninstalled.

FIG. 2 shows an uninstalled ducting element 2. In this Figure, the flange 9 is not deformed, but is directed radially outwards from the ducting element 2. As may be appreciated from the two Figures, there are fitted or integral snap elements 10 on the first part that are designed to prevent the ducting element, once installed, from being displaced back out of the installed position. This is particularly important when the material of the ducting element ages and resultingly dries and shrinks to a certain degree.

What is claimed and desired to be secured by Letters Patent is as follows:

1. A duct arrangement positioned through an opening in a wall, said duct arrangement comprising:
   an elongated ducting element having a sealing component projecting therefrom on all sides, said sealing component being configured to bear against perimeter edges of an opening in a wall so that a seal is affected between two sides of the wall, thereby defining an installed position;
   a connecting part;
   a flexible section of the ducting element located between the sealing component and the connecting part and adapted so that under the effect of a small force applied anywhere along a longitudinal extent of a part at a front of the flexible section, displacement of the part at the front of the flexible section in relation to its unloaded longitudinal extent is permitted, thereby allowing adjustment of the connecting part relative to that of the flexible section and the sealing component; and
   a wall, when viewed from a front face toward an installed ducting element, having a depression formed all around the opening and configured so that the opening substantially forms the lowest point of the depression, the wall being thereby adapted to guide a tip of the ducting element toward and through the opening establishing the installed position.

2. The arrangement as recited in claim 1, wherein the sealing component is a flexible flange that in the installed position is deformed towards the edges of the opening thereby achieving the seal.

3. The arrangement as recited in claim 1, wherein the flexible section further comprises at least one radial corrugation.

4. The arrangement as recited in claim 1, further comprising:
   an adaptation configured to prevent the ducting element, once installed in the opening of the wall and into the installed position from being displaced therefrom, said adaptation being at least one snap element arranged in front of the sealing component.

5. The arrangement as recited in claim 1, wherein the connecting part is adapted for connection to a pipe for conveying fluid, the connecting part located in one area around an end thereof of the ducting element.

6. A method for establishing an elongated ducting element in an installed position in an opening in a wall, said method comprising the steps of:

provding a ducting element with a sealing component projecting on all sides thereof and arranging said ducting element into an installed position in which the sealing component bears against edges of the opening so that a sealing affect is provided between two sides of the wall;

providing the ducting element with a connecting part;

configuring the element so that a flexible section is provided between the sealing component and the connecting part, said flexible section being adapted so that under the effect of a slight force applied anywhere along a longitudinal extent of a part at a front of the flexible section, the part at the front of the flexible section is displaced relative to an unloaded longitudinal extent thereof, thereby allowing adjustment of the connecting part relative to the flexible section and sealing component;

providing the wall so that when viewed from a front face thereof and in the direction of ducting, a depression is established all around the opening so that the opening essentially forms the lowest point of the depression; and inserting a tip of the ducting element toward the depression in the wall, and due to the configuration of the element, the tip is guided toward and through the opening for establishing the installed position.

7. The method as recited in claim 6, wherein the flexible section is formed by at least one corrugation running all round.

8. The method as recited in claim 6, wherein the sealing component is a flexible flange which, when introduced into the opening, is deformed towards the edges of the opening thereby producing a seal.

9. The method as recited in claim 6, further comprising:

utilizing a robot to guide the ducting element toward the depression.

10. The method as recited in claim 6, further comprising:

preventing the ducting element, after installation, from leaving the installed position.

11. A duct arrangement positionable through an opening in a wall, said duct arrangement comprising:

an elongated ducting element having a sealing component projecting therefrom on all sides, said sealing component being configured to bear against perimeter edges of an opening in a wall so that a seal is affected between two sides of the wall, thereby defining an installed position;

a connecting part; and a flexible section of the ducting element located between the sealing component and the connecting part and adapted, so that under the effect of a small force applied anywhere along a longitudinal extent of a part at a front of the flexible section, displacement of the part at the front of the flexible section in relation to its unloaded longitudinal extent is permitted, thereby allowing adjustment of the connecting part relative to the position of the sealing component and flexible section.

\* \* \* \* \*